US007880686B2

(12) United States Patent
Yokodate et al.

(10) Patent No.: US 7,880,686 B2
(45) Date of Patent: Feb. 1, 2011

(54) MOBILE DEVICE

(75) Inventors: Shinya Yokodate, Kanagawa (JP); Shinzo Yokodate, legal representative, Kamakura (JP); Naoki Toyama, Tokyo (JP); Takeshi Tomimori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 648 days.

(21) Appl. No.: 10/574,970

(22) PCT Filed: Jun. 8, 2004

(86) PCT No.: PCT/JP2004/008276

§ 371 (c)(1),
(2), (4) Date: Apr. 7, 2006

(87) PCT Pub. No.: WO2005/122536

PCT Pub. Date: Dec. 22, 2005

(65) Prior Publication Data
US 2008/0212269 A1 Sep. 4, 2008

(51) Int. Cl.
G09G 5/00 (2006.01)
(52) U.S. Cl. ............................ 345/1.1; 345/204; 345/30
(58) Field of Classification Search .................. 345/82, 345/30–55, 59, 204–207
See application file for complete search history.

(56) References Cited

U.S. PATENT DOCUMENTS

| 6,016,132 | A * | 1/2000 | Takahashi ............... 345/82 |
| 6,944,482 | B2 * | 9/2005 | Engstrom et al. ......... 455/566 |
| 7,110,796 | B2 * | 9/2006 | Lee ........................ 455/566 |
| 7,356,361 | B1 * | 4/2008 | Hawkins et al. ......... 455/575.1 |
| 2003/0189557 | A1 * | 10/2003 | Takagi et al. ............ 345/204 |
| 2004/0041749 | A1 * | 3/2004 | Dixon ...................... 345/33 |
| 2005/0038982 | A1 * | 2/2005 | Park et al. ................ 713/1 |
| 2006/0018102 | A1 * | 1/2006 | Soderlund ................ 361/752 |

FOREIGN PATENT DOCUMENTS

| CN | 1185686 | 6/1998 |
| JP | 6-175591 | 6/1994 |
| JP | 07-039075 | 7/1995 |
| JP | 39075/1995 | 7/1995 |
| JP | 8-125231 | 5/1996 |
| JP | 10-63227 | 3/1998 |

(Continued)

OTHER PUBLICATIONS

U.S. Appl. No. 11/980,644, filed Oct. 31, 2007, Tomimori.

(Continued)

*Primary Examiner*—Alexander Eisen
*Assistant Examiner*—Christopher E Leiby
(74) *Attorney, Agent, or Firm*—Oblon, Spivak, McClelland, Maier & Neustadt, L.L.P.

(57) ABSTRACT

A portable terminal capable of display of high luminance with low power consumption and configured to be provided with an LED display panel having a plurality of light-emitting diodes matrix-arranged in a display window formed on the surface of a casing accommodating electronic components and to control display of the light-emitting diodes of the LED display panel with a display control unit. The portable terminal performs display of high luminance with low power consumption with the matrix-arranged light-emitting diodes.

13 Claims, 13 Drawing Sheets (a) (b) (c)

FOREIGN PATENT DOCUMENTS

| | | |
|---|---|---|
| JP | 10-228250 | 8/1998 |
| JP | 11-030226 | 2/1999 |
| JP | 11-65477 | 3/1999 |
| JP | 3068833 | 3/2000 |
| JP | 2001-136247 | 5/2001 |
| JP | 2001-143501 | 5/2001 |
| JP | 2002-026393 | 1/2002 |
| JP | 2002-51135 | 2/2002 |
| JP | 2002-152632 | 5/2002 |
| JP | 2002-169198 | 6/2002 |
| JP | 2002-261335 | 9/2002 |
| JP | 2003-218990 | 7/2003 |
| JP | 2003-219062 | 7/2003 |
| JP | 2003-259182 | 9/2003 |
| JP | 2003-283616 | 10/2003 |
| JP | 2004-80390 | 3/2004 |
| JP | 2004-88316 | 3/2004 |
| JP | 2004-159363 | 6/2004 |
| JP | 2004-187154 | 7/2004 |
| JP | 2004-219687 | 8/2004 |
| JP | 2005-275151 | 10/2005 |

OTHER PUBLICATIONS

U.S. Appl. No. 11/573,463, filed Feb. 9, 2007, Tomimori.

* cited by examiner

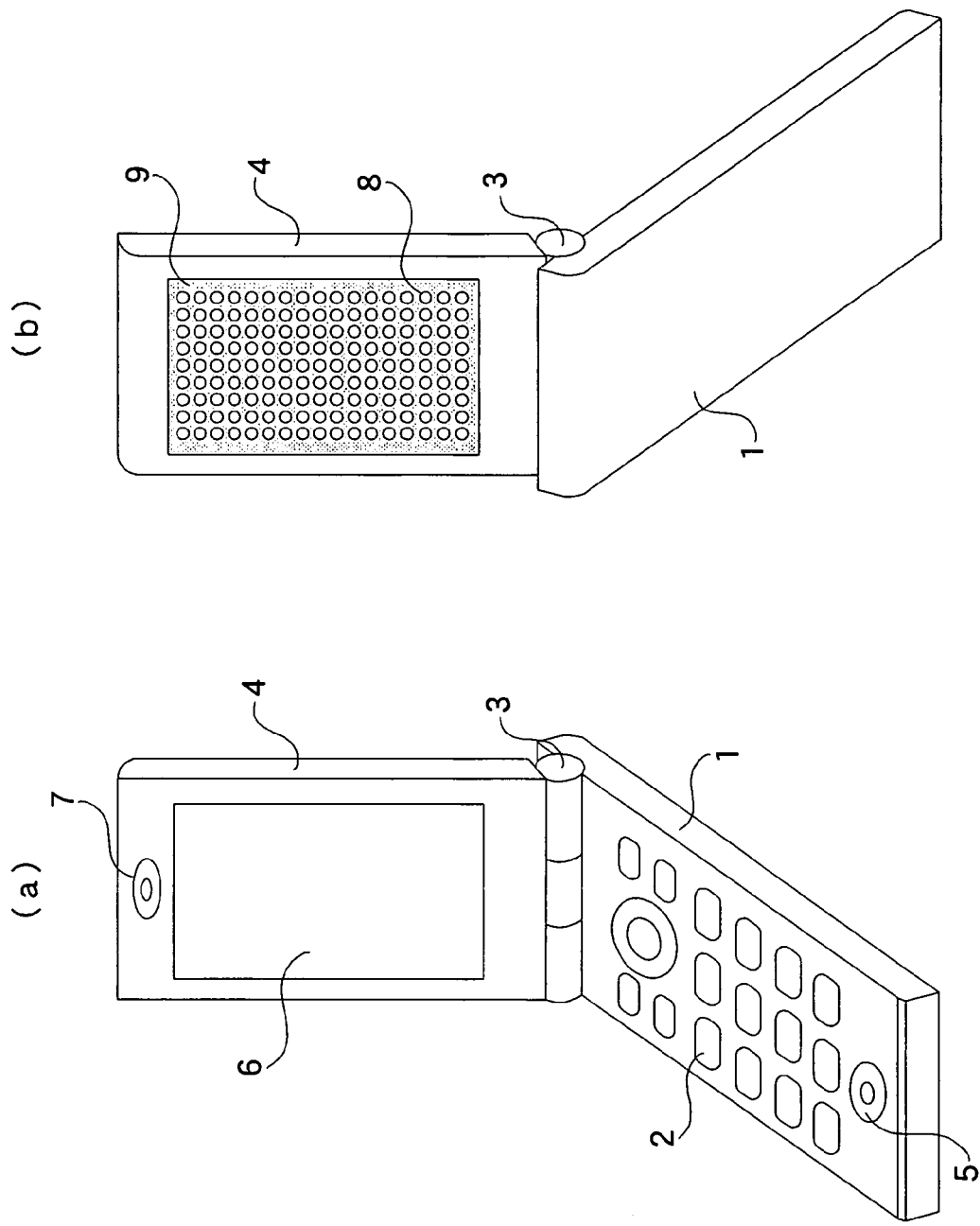

F I G.2
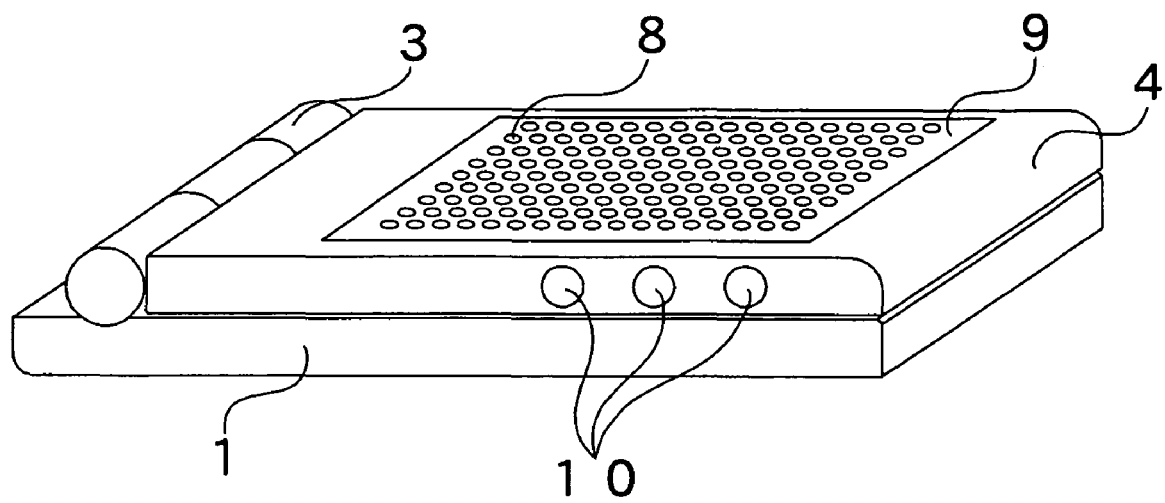

FIG.4
(a) (b) (c)
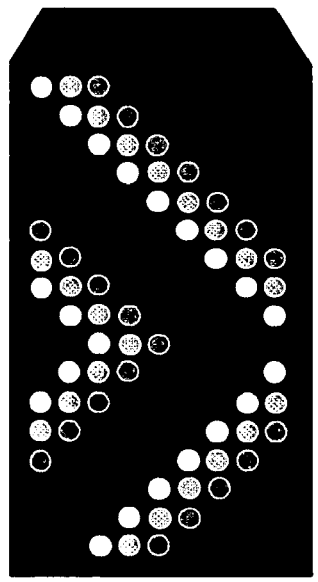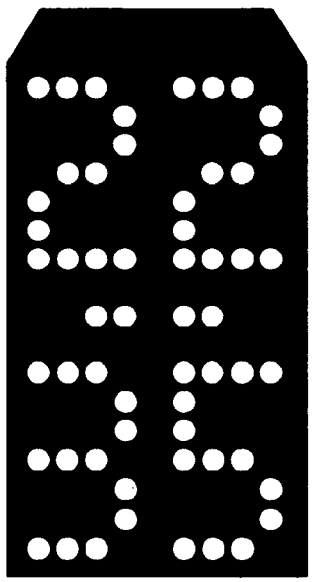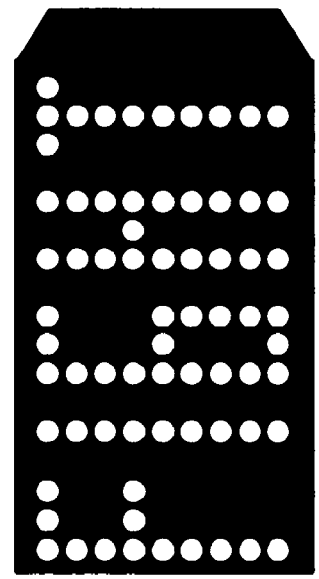

F I G. 5
(a)
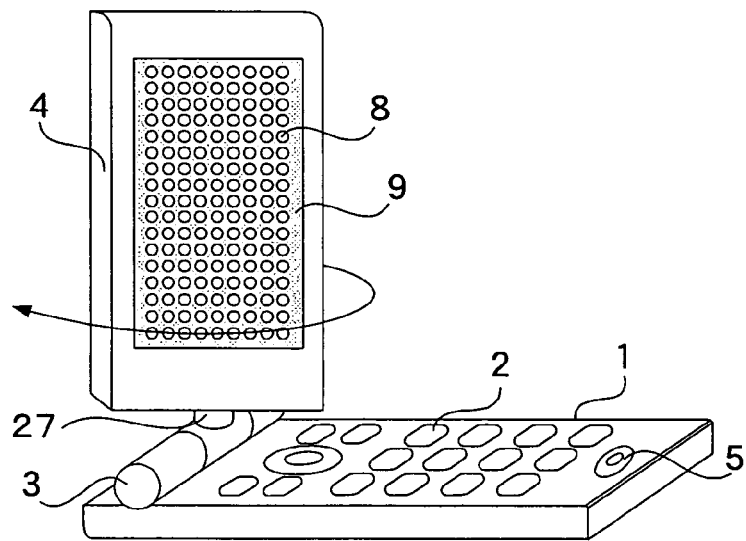
(b)
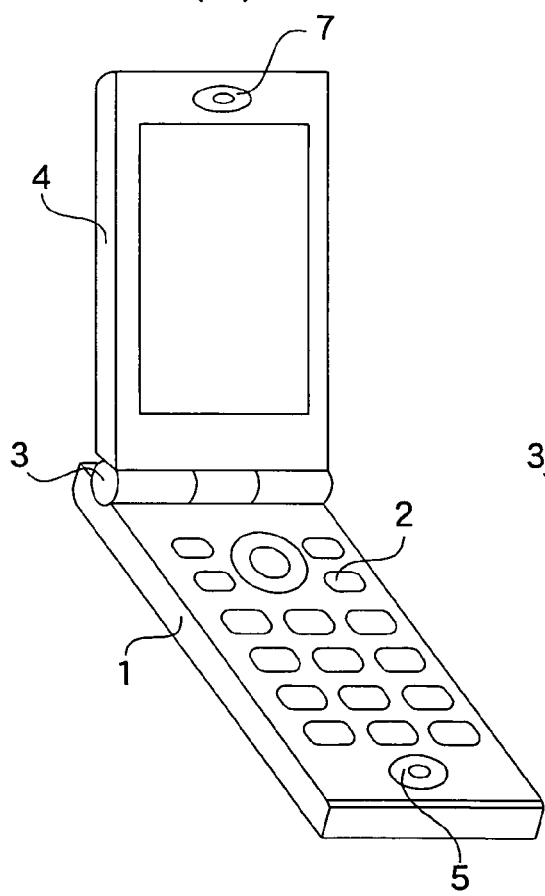
(c)
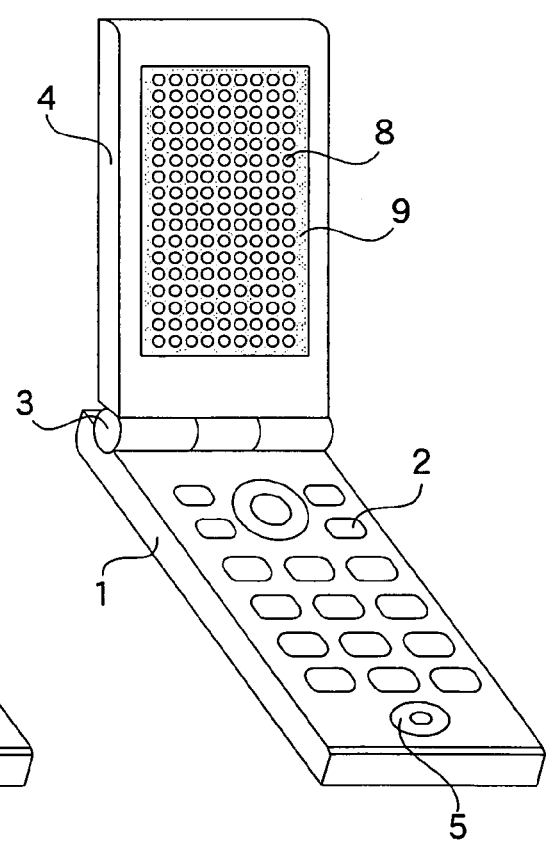

F I G. 1 1
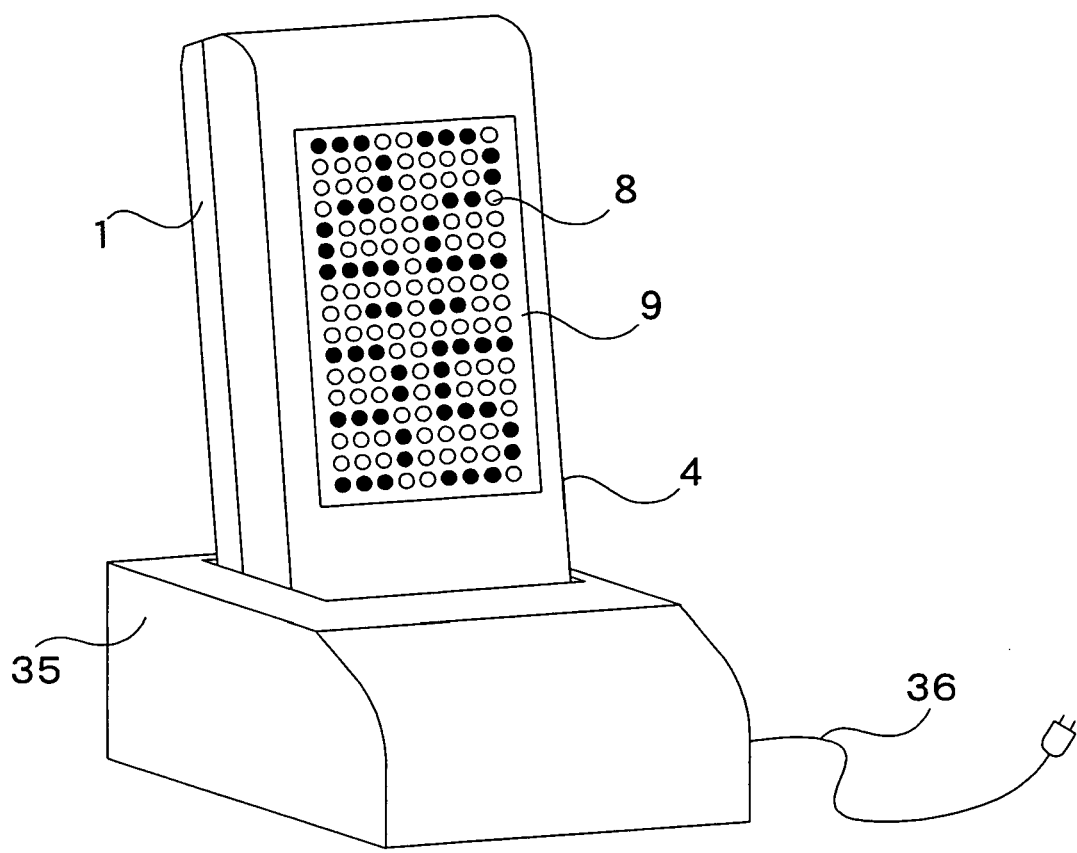

F I G. 1 2
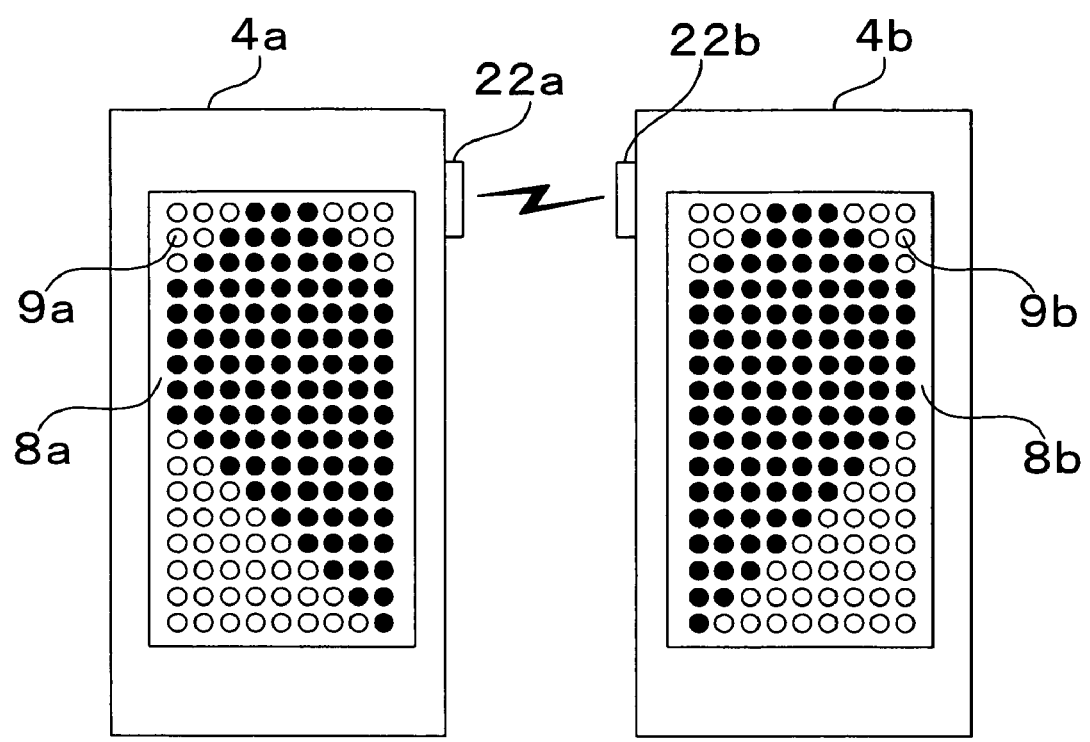

MOBILE DEVICE

TECHNICAL FIELD

The present invention relates to a portable apparatus such as a portable telephone, for example, provided with a display device, and more particularly, it relates to a portable apparatus reducing power consumption of a display device and improving luminance at the time of lighting the display device.

BACKGROUND TECHNIQUE

In general, there is the one described in Japanese Patent Application Laid-Open No. 2002-51135 as a portable telephone provided with a display device posting incoming call information. This portable telephone is a folio-type portable telephone, which is provided with a character display part on the back surface of a display-side casing provided with a main display part as an incoming call information display part. When there is an incoming telephone call, an LED (light-emitting diode) provided therein as a provided backlight emits light to highlight a character of a telephone pattern to post the incoming call.

While this prior art uses light emission of the light-emitting diode as the backlight and it is necessary to highlight the character display part in high luminance so that the user confirms the incoming telephone call on a separate position, it has been necessary to feed a high current to the light-emitting diode therefor. In other words, this prior art has such a problem that the same cannot light the character display part in high luminance or requires large power consumption even if the former can light the latter in high luminance.

As another prior art, there is the one described in Japanese Patent Application Laid-Open No. 2001-136247. This prior art is a folio-type portable telephone, which is provided with display means consisting of a liquid crystal display device or the like as an auxiliary display part on the back surface of a display-side casing provided with a main display part. The display means digitally displays a numerical value as to the length of a call, while analogly displaying an hourglass.

However, since this conventional apparatus also uses a light-emitting diode as a backlight and the transmittance of the liquid crystal display device is as low as not more than 10%, there is such a problem that the same cannot make display in high luminance or requires large power consumption even if the same can make display in high luminance, similarly to the aforementioned prior art.

An object of the present invention is to obtain a portable apparatus having a display device capable of display of high luminance with low power consumption.

The display device of the portable apparatus according to the present invention can display various indications such as letters and images in high luminance.

DISCLOSURE OF THE INVENTION

The portable apparatus according to the present invention comprises an LED display panel which is arranged in a display window formed on the surface of a casing accommodating electronic components, and which has a plurality of light-emitting diodes (LEDs) outwardly projecting light and matrix-arranged in a plane, a display control unit controlling display of the light-emitting diodes of the aforementioned LED display panel on the basis of input display data, a main control unit outputting the aforementioned display data displayed on the aforementioned LED display panel to the aforementioned display control unit and a battery supplying power to the aforementioned LED display panel, the display control unit and the main control unit.

According to the present invention, therefore, display of high luminance with low power consumption is enabled by the matrix-arranged light-emitting diodes.

The portable apparatus according to the present invention comprises a hinge coupling an end of an operation-side casing having an operation part and an end of a display-side casing having a main display part with each other for pivotable movement thereof, an LED display panel which is arranged in a display window formed on a casing surface of the aforementioned display-side casing other than a surface provided with the main display part, and which has a plurality of light-emitting diodes (LEDs) outwardly projecting light and matrix-arranged in a plane, a display control unit controlling display of the light-emitting diodes of the aforementioned LED display panel on the basis of input display data, a main control unit outputting the aforementioned display data displayed on the aforementioned LED display panel to the aforementioned display control unit and a battery supplying power to the aforementioned LED display panel, the display control unit and the main control unit.

According to the present invention, therefore, light-emitting diodes matrix-arranged in a folio-type portable apparatus enable display of high luminance with low power consumption.

In the portable apparatus according to the present invention, the battery is provided in the operation-side casing.

According to the present invention, therefore, the battery is provided on the operation-side casing and the LED display panel is provided on the display-side casing, whereby the weight balance of both casings becomes better, and operability improves.

In the portable apparatus according to the present invention, the main display part is provided on a surface of the aforementioned display-side casing facing the aforementioned operation-side casing when the operation-side casing and the display-side casing are in their closed position and the LED display panel is provided on a surface of the aforementioned display-side casing opposed to the surface provided with the main display part at a normal time, while the aforementioned display-side casing is configured to be rotatable by at least 180° about a direction perpendicular to the core of a hinge axis.

According to the present invention, therefore, it is a folio-type biaxial hinge portable apparatus, and it is possible to operate the operation part while observing the LED display panel.

The portable apparatus according to the present invention has a camera imaging an object and an operation part photographically operating this camera, while the LED display panel is so arranged that the light-emitting diodes project light in a direction to which the aforementioned camera is directed in operation of the aforementioned camera and the display control unit controls lighting of the aforementioned light-emitting diodes in association with the photographic operation of the aforementioned camera.

According to the present invention, therefore, it is possible to make the LED display panel function as a flashlight in association with the photographic operation of the camera.

In the portable apparatus according to the present invention, the display control unit controls display of the luminescent color of the light-emitting diodes to white or another luminescent color.

According to the present invention, therefore, it is possible to project light of a user's favorite luminous color from the LED display panel functioning as a flashlight.

The portable apparatus according to the present invention renders the display control unit capable of controlling lighting of a previously set number of the light-emitting diodes.

According to the present invention, therefore, it is possible to set the number of the light-emitting diodes functioning as flashlights in response to ambient brightness.

The portable apparatus according to the present invention has a photosensor sensing ambient brightness, while the display control unit controls lighting of the light-emitting diodes of a number corresponding to the brightness sensed by the aforementioned photosensor.

According to the present invention, therefore, it is possible to automatically set the number of the light-emitting diodes functioning as flashlights in corresponding to the ambient brightness sensed by the photosensor.

In the portable apparatus according to the present invention, the LED display panel is detachably arranged in the display window.

According to the present invention, therefore, it is possible to replace the LED display panel with another LED display panel.

The portable apparatus according to the present invention is capable of substitutionally arranging another LED display panel performing display of a different luminescent color in the display window.

According to the present invention, therefore, it is possible to substitute the LED display panel of the different luminous color.

The portable apparatus according to the present invention has an operation key operable in a state that the operation-side casing and the display-side casing are in their closed position, so that the main control unit can switch display contents of the LED display panel by operation of this key.

According to the present invention, therefore, it is possible to switch the display contents of the LED display panel in a state closing the folio-type portable apparatus.

In the portable apparatus according to the present invention, the LED display panel has a lattice plate having a plurality of latticelike holes formed on the plurality of light-emitting diodes arranged in a matrix in coincidence with the arrangement of the plurality of light-emitting diodes, while the aforementioned light-emitting diodes outwardly project light through the holes of the aforementioned lattice plate.

According to the present invention, therefore, it is possible to prevent interference by light emission of adjacent light-emitting diodes by the lattice plate.

In the portable apparatus according to the present invention, the LED display panel has a diffusion sheet diffusing light on the lattice plate, and the light-emitting diodes outwardly project light through the holes of the aforementioned lattice plate and the diffusion sheet.

According to the present invention, therefore, it diffuses the light emitted by each light-emitting diode with the diffusion sheet, whereby the display of the LED display panel becomes easy to observe.

The portable apparatus according to the present invention makes the diffusion sheet a colored diffusion sheet.

According to the present invention, therefore, it is possible to render the display of the LED display panel the user's favorite color.

The portable apparatus according to the present invention has a speaker generating a warning sound by operation, so that the display control unit can control display of the light-emitting diodes of the LED display panel in association with the aforementioned operation.

According to present invention, therefore, it is possible to make display of high luminance on the LED display panel along with the warning sound.

BRIEF DESCRIPTION OF THE DRAWINGS

FIG. 1 is perspective views showing an embodiment 1 applying the present invention to a folio-type portable telephone.

FIG. 2 is a perspective view showing a state of closing the folio-type portable telephone according to the embodiment 1.

FIG. 4 is diagrams showing exemplary displays displaying images on an LED display panel 9 according to the present invention.

FIG. 5 is perspective views showing an embodiment 2 applying the present invention to a folio-type portable telephone.

FIG. 11 is a perspective view showing exemplary usage making an LED display panel of a portable apparatus loaded on a charging holder display a time pattern.

FIG. 12 is a diagram showing exemplary usage performing affinity divination with two portable telephones.

BEST MODES FOR CARRYING OUT THE INVENTION

Figure 3:
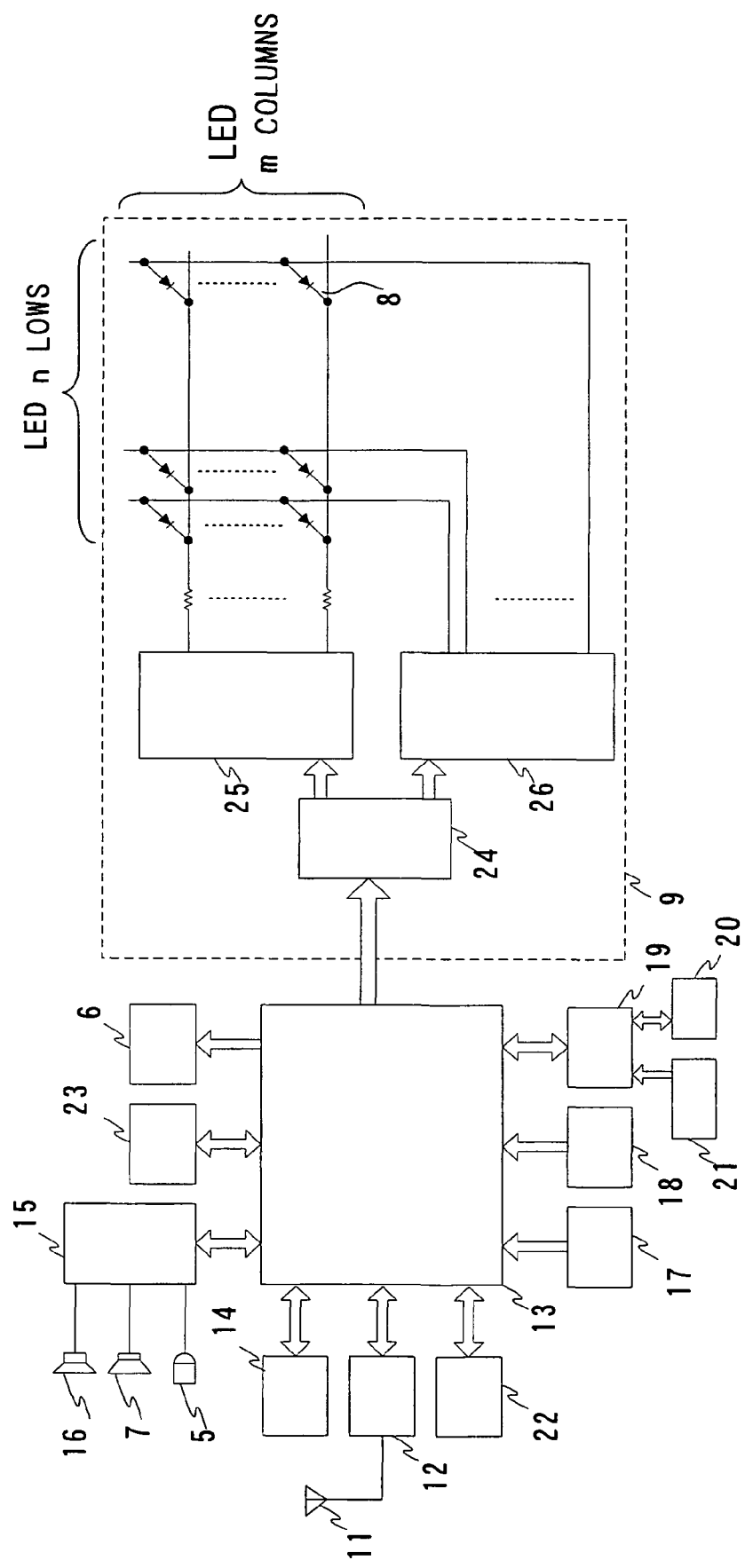
FIG. 3 is a folio-type portable telephone block diagram according to the embodiment 1.

FIG. 1 is perspective views showing an embodiment 1 applying the present invention to a folio-type portable telephone, FIG. 1(a) is a perspective view observing the folio-type portable telephone from the front side in an open state, and FIG. 1(b) is a perspective view observing the same from the back side.

In the figures, 1 is an operation-side casing, having an operation part in which a plurality of operation keys 2 are arranged, an end of which is coupled with an end of a display-side casing 4 by a hinge 3. A microphone 5 used by a user for a call is provided on another end of the operation-side casing 1. On the other hand, a main display part 6 displaying letters and images is provided on the front side of the display-side casing 4 as shown in FIG. 1(a). This main display part 6 is a liquid-crystal display device (LCD). A receiver 7 outputting the voice of a called/calling person is provided on the other end of the display-side casing 4. An LED display panel 9 in which a plurality of light-emitting diodes (LEDs) 8 are matrix-arranged is provided on the back side of the display-side casing 4 as shown in FIG. 1(b). This LED display panel 9 is mounted on a display window formed on the back surface of the display-side casing 4, to arrange the light-emitting diodes 8 in n rows by m columns, by 153 pieces in 9 rows by 17 columns in the example of the figures. The light-emitting diodes 8 are implemented at a pitch of 3.2 mm, and the size of a display part of the LED display panel 9 is about 2.4 inches (53.9 mm by 28.3 mm). Therefore, the LED display panel 9 occupies substantially the overall area of the back surface of the display-side casing 4, and can make display of high luminance on a relatively large screen.

FIG. 2 shows a state of closing the folio-type portable telephone according to the embodiment 1 of the present invention. In the figure, 10 are side keys, arranged on a side surface of the display-side casing 4, which are operable in a state that the operation-side casing 1 and the display-side casing 4 are in their closed position. The side keys 10 are keys switching of display contents on the LED display panel 9 and ON-OFF controlling display of the LED display panel 9.

The circuit structure of the folio-type portable telephone according to the embodiment 1 of the present invention is now described.

FIG. 3 is a folio-type portable telephone block diagram according to the embodiment 1. In the figure, 11 is an antenna for making radio communication, which receives electric waves received from the called/calling person and inputs the same in a radio part 12. The radio part 12 amplifies and frequency-converts an input signal, and inputs the same in a baseband IC 13. The baseband IC 13 as a main control unit takes charge of control of the overall portable telephone, and operates according to a program stored in a memory part 14. The memory part 14 stores various data and data processed by the baseband IC 13 in addition to the program operating the baseband IC 13.

When there is an incoming telephone call, the baseband IC 13 operates a speaker through a sound part 15 to post the incoming call to the user, while connecting a line with a terminal of the calling person and enabling the call with the microphone 5 and the receive 7 when the user responds to the incoming call. The user's voice is incorporated into the portable telephone through the microphone, and transmitted through the sound part 15, the baseband IC 13, the radio part 12 and the antenna 11.

17 is an operation part consisting of the operation keys 2 and the side keys 10. 18 is an RTC (real time clock), which outputs correct time information. A power control part 19 supplies power generated by a battery 20 to each part, while supplying power input from a charging terminal 21 to the battery 20 and charging the battery 20. The battery 20 is accommodated in the operation-side casing 1. 22 is infrared communication means for performing local data communication, and 23 is a camera (not shown in FIG. 1 and FIG. 2) built in the portable telephone.

9 is an LED display panel, which consists of a control microcomputer 24, an X-directional control driver 25, a Y-directional control driver 26 and the light-emitting diodes 8 matrix-arranged in 9 rows by 17 columns. The control microcomputer 24, the X-directional control driver 25 and the Y-directional control driver 26 function as a display control unit controlling display of the light-emitting diodes 8.

In the portable apparatus according to the present invention, the light-emitting diodes 8 are matrix-arranged on the surface of a portable apparatus casing, and display of high luminance is obtained with low power consumption. FIG. 4 shows exemplary displays displaying images on the LED display panel 9 according to the present invention. FIG. 4(*a*) is an example displaying a pattern such as a graphic or a design, which is displayed when the portable telephone receives an incoming call, or during a call, for example. As to the pattern displayed on the LED display panel 9, it is possible to scroll the display in the horizontal direction and the vertical direction, flash the display, or display the same with gradation. Therefore, it can make display of high luminance and impactive display, whereby the user can notice an incoming call also when the portable telephone receives the incoming call on a position separating from the user.

The memory part 14 of FIG. 3 stores such a display pattern, and when the baseband IC 13 senses an incoming call, it reads the data of the display pattern from the memory part 14 and transfers the same to the control microcomputer 24. The control microcomputer 24 receiving the data of the display pattern drives the X-directional control driver 25 and the Y-directional control driver 26 on the basis of this data, to make the matrix-arranged light-emitting diodes 8 display the pattern such as the graphic or the design.

It is also possible for the user to create the display pattern by key entry with the operation keys 2 and register the same in the memory part 14, and it is further possible to register a display pattern data-received from outside in the memory part 14.

FIG. 4(*b*) shows an example making the LED display panel 9 display a time. It displays 22 o'clock 35 minutes in the illustration. This display is displayed by operating the side keys 10 when the user wishes to know the current time, for example.

Assuming that the user presses the side keys 10 of the operation part 17 in FIG. 3, the baseband IC 13 detects the pressing of the side keys 10. The baseband IC 13 reads the current time from the RTC 18, and converts this time data to display pattern data stored in the memory part 14 therein. The display pattern data converted in the baseband IC 13 is transferred to the control microcomputer 24, and this control microcomputer 24 drives the X-directional control driver 25 and the Y-directional control driver 26 to make the matrix-arranged light-emitting diodes 8 display the pattern of time display.

It is possible to operate the side keys 10 in a state closing the folio-type portable telephone, whereby the user can immediately confirm the time when he/she wishes to know the current time.

FIG. 4(*c*) shows an example displaying letters on the LED display panel 9. The illustrated example is an example displaying "FIGHT". As to the letters displayed on the LED display panel 9, it is also possible to register letter patterns input by the user through the operation keys 2 in the memory part 14, and it is further possible to register letter patterns data-received from outside in the memory part 14.

In other words, when the user operates the operation keys 2 of the operation part 17 or the side keys 10 thereof, the baseband IC 13 senses this and reads a letter pattern corresponding to the key operation from the memory part 14. The read letter pattern is transferred to the control microcomputer 24, and this control microcomputer 24 drives the X-directional control driver 25 and the Y-directional control driver 26 to make the matrix-arranged light-emitting diodes 8 display the pattern of the letters.

The present invention, which is characterized in making display of high luminance with low power consumption, is now contrasted with power consumption and luminance of a generally conventionally used liquid crystal display (LCD).

In the case of the LED display panel according to the present invention, it becomes about 2.4 inches (53.9 mm by 28.3 mm) when matrix-arranging the light-emitting diodes in 9 rows by 17 columns at a pitch of 3.2 mm. Luminance is about 400 $cd/m^2$, and power consumption at this time becomes 180 mA from 20 mA by 9 lamps when feeding a current of 20 mA to one light-emitting diode since it lights the same by successively scanning the same row by row. Further, the control part consumes power by about 10 mA, whereby the power consumption becomes about 190 mA in total.

On the other hand, while luminance of the LCD is generally 200 cd/m$^2$, it is necessary to feed a current of 60 mA to four light-emitting diodes used as backlights when wishing to obtain luminance of 400 cd/m$^2$ on a screen of 2.4 inches. Current consumption of the LCD body is 10 mA, whereby it becomes four lamps×60 mA+10 mA, and the power consumption becomes 250 mA.

In other words, when contrasting display by the LED display panel 9 according to the present invention and display of the LCD with each other, it can be said that the LED display panel 9 is the one superior in luminance, power consumption and visibility from afar although the same is inferior in resolution.

As hereinabove described, a display of high luminance is obtained with low power consumption according to the embodiment 1 of the present invention.

Further, it accommodates the relatively heavy battery 20 in the operation-side casing 1 while providing the LED display panel 9 in the display-side casing 4, whereby weight balance becomes better and operability improves as compared with a case of providing the LED display panel 9 on the same operation-side casing 1 as the battery 20.

Further, it is possible to display a pattern of time display or a letter pattern on the LED display panel 9 by operation of the side keys 10, whereby it is possible to easily make display in a state that the operation-side casing 1 and the display-side casing 4 are in their closed position.

An embodiment 2 of the present invention is now described.

FIG. 5 is perspective views showing the embodiment 2 applying the present invention to a folio-type portable telephone. In this embodiment 2, an operation-side casing 1 and a display-side casing 4 are configured to move pivotably with a hinge 3, while the display-side casing 4 is constituted to be rotatable about a direction perpendicular to the axis of the hinge 3 through a rotation axis 27.

FIG. 5(*b*) is a normal state, in which a main display part 6 faces the operation-side casing 1 when the operation-side casing 1 and the display-side casing 4 are in their closed position. In this normal state, a user can operate operation keys 2 while observing the main display part.

FIG. 5(*a*) shows a state where the display-side casing 4 rotates by 90° about the rotation axis 27.

FIG. 5(*c*) is a state further rotating the display-side casing 4 to rotate by 180°. In this state, the user can operate the operation keys 2 while observing an LCD panel 9.

Therefore, it is possible to operate the operation keys 2 while observing display on the LED display panel 9 according to this embodiment 2.

An embodiment 3 of the present invention is now described.

Figure 6:
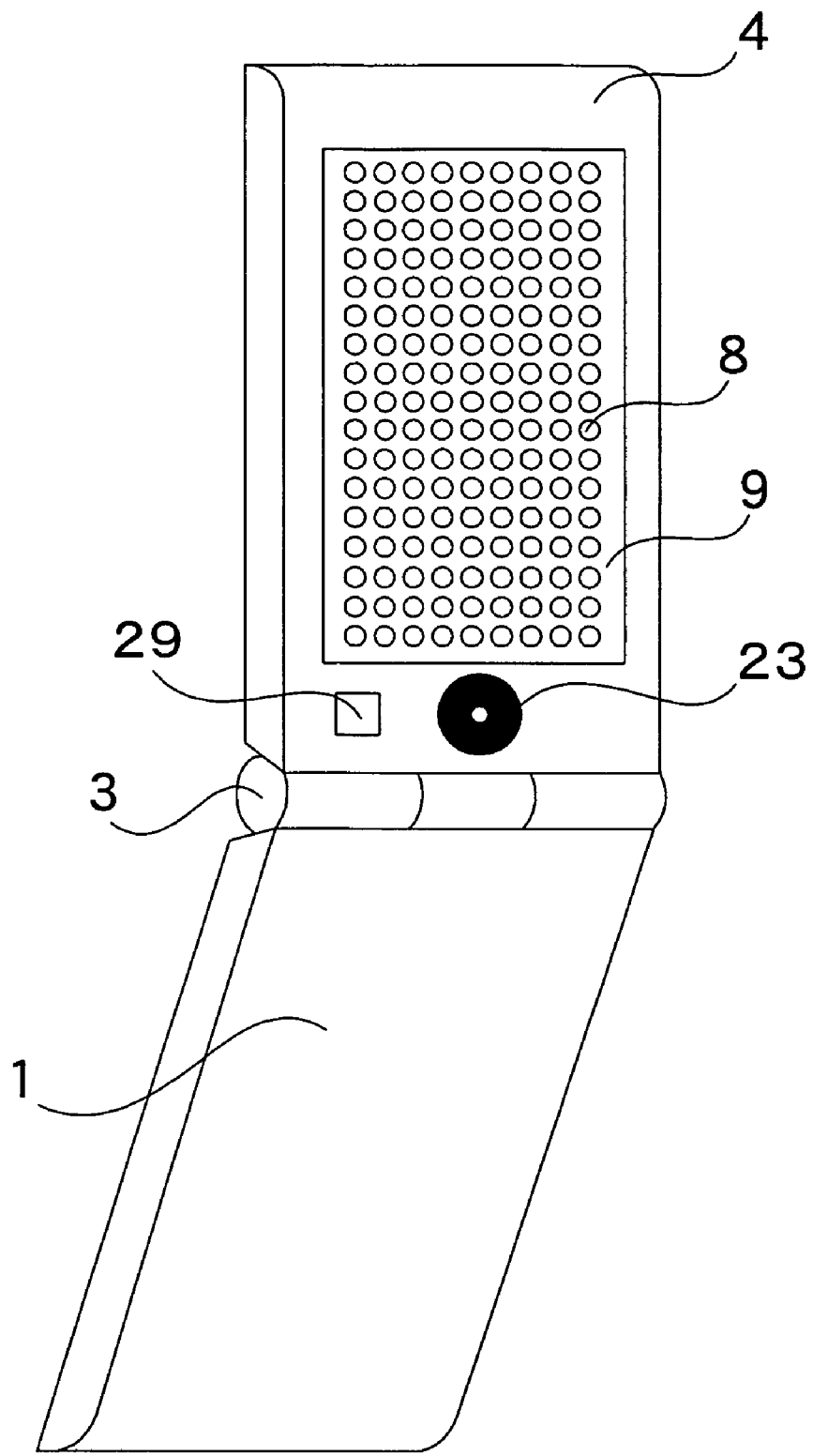
FIG. 6 is a perspective view showing an embodiment 3 applying the present invention to a portable telephone provided with a camera.

FIG. 6 is a perspective view showing the embodiment 3 applying the present invention to a portable telephone provided with a camera. Referring to FIG. 6, a camera 23 is provided on the back surface of a display-side casing 4. This camera 23 is arranged toward a direction in which light-emitting diodes 8 project light. A photosensor 29 sensing ambient brightness is provided in the vicinity of the camera 23.

This embodiment 3 uses the light-emitting diodes 8 of an LED display panel 9 as flashlights in photographing with the camera 23. In other words, it makes the light-emitting diodes 8 emit light in association with operation of a shutter button (not shown) of the camera 23. It matrix-arranges the light-emitting diodes 8 in 9 rows by 17 columns, and 9 light-emitting diodes 8 simultaneously emit light at the maximum.

While it makes the light-emitting diodes 8 emit white light when employing the same as flashlights in general, it is possible to enjoy photographing different from a natural color according to a user's favor when making the same emit light of another luminous color such as red or blue, for example.

While it is possible to light 9 light-emitting diodes 8 at the maximum according to this embodiment 3 when employing the LED display panel 9 as a flashlight, the number of the lighted light-emitting diodes 8 may be limited when ambient brightness is bright. As means for limiting the number of the lighted light-emitting diodes 8, the user may set/input the lighted number by operation of operation keys 2, or a baseband IC 13 may perform automatic setting on the basis of a sense output of a photosensor 29 sensing the ambient brightness.

An embodiment 4 of the present invention is now described.

Figure 7:
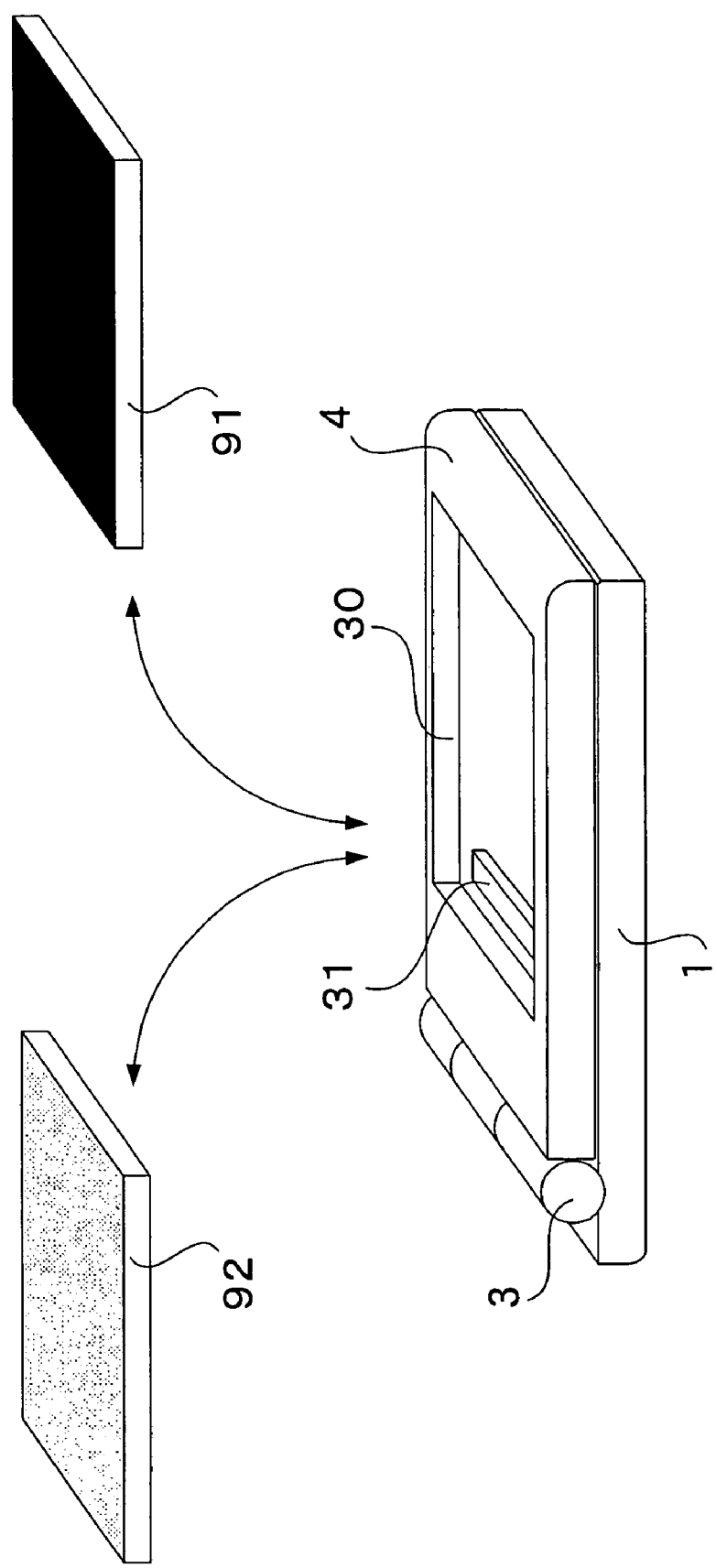
FIG. 7 is a perspective view showing an embodiment 4 rendering an LED display panel replaceable.

FIG. 7 is a perspective view showing the embodiment 4 rendering an LED display panel replaceable. Referring to FIG. 7, 91 and 92 are LED display panels respectively, which are attachable to/detachable from a display window 30 provided on the back surface of a display-side casing 4. The LED display panel 91 or 92 is mounted on the display window 30, to be electrically connected to a portable telephone body through a connection connector 31.

In other words, the LED display panels 91 and 92 are LED display panels on which light-emitting diodes 8 of different luminous colors are matrix-arranged, for example, and the LED display panel 91 is the one in which light-emitting diodes 8 emitting light of a single color are matrix-arranged, while the other LED display panel 92 is the one in which light-emitting diodes 8 emitting light of another single color or emitting light of at least two colors are matrix-arranged.

Therefore, the user can enjoy display by mounting his/her favorite LED display panel 91 or 92. This embodiment 4 renders the LED display panels 91 and 92 attachable to/detachable from the display window 30, whereby it is possible to easily exchange the same when the same are out of order.

An embodiment 5 of the present invention is now described.

Figure 8:
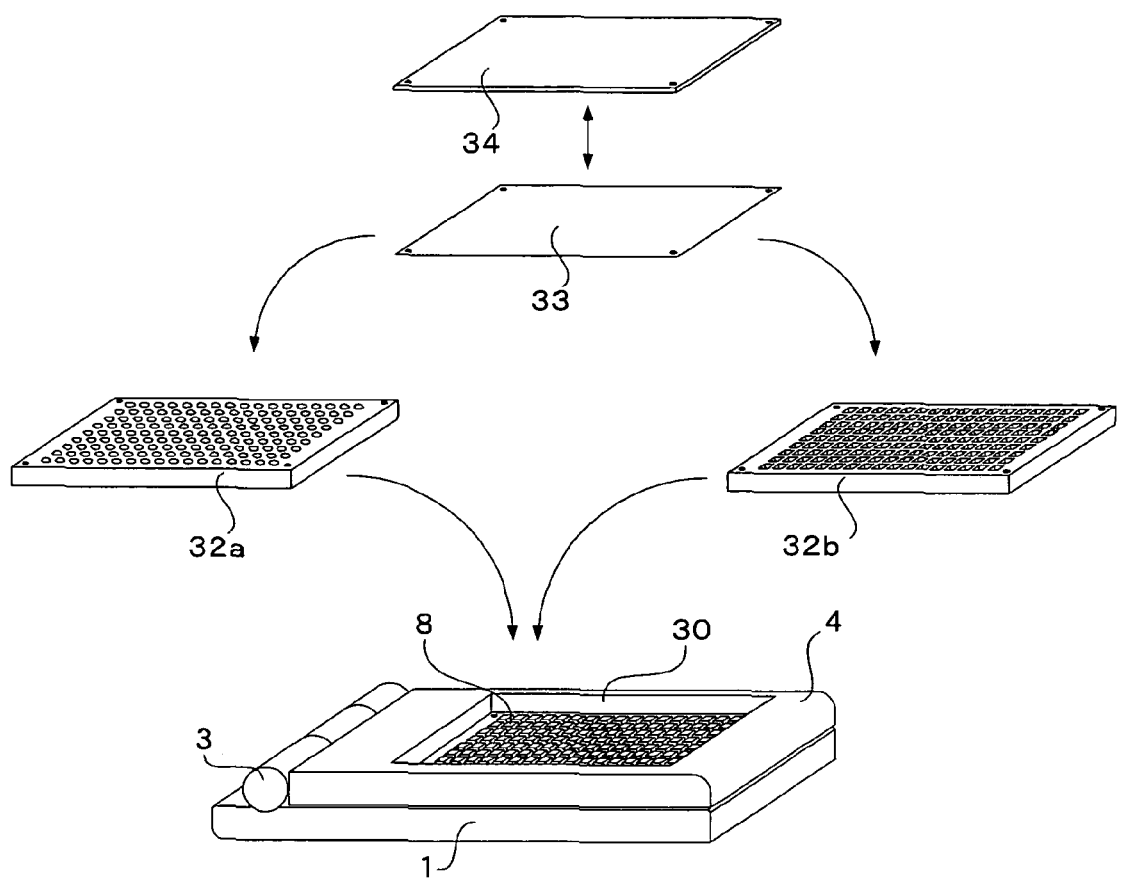
FIG. 8 is a perspective view showing an embodiment 5 providing on light-emitting diodes of an LED display panel 9 a lattice plate matched with the arrangement of the light-emitting diodes.

FIG. 8 is a perspective view showing the embodiment 5 providing on light-emitting diodes of an LED display panel 9 a lattice plate matched with the arrangement of the light-emitting diodes and rendering the lattice plate replaceable with another lattice plate whose lattice shape is different. Referring to FIG. 8, 32a and 32b are lattice plates formed with lattice holes matched with the arrangement of matrix-arranged light-emitting diodes 8, which are selectively mounted on a display window 30. The shape of the lattice holes is round in the lattice plate 32a, while the shape of the lattice holes is rectangular in the lattice plate 32b.

Further, a diffusion sheet 33 diffusing light is mounted on the lattice plate 32a or 32b assembled into the display window 30, while, on the diffusion sheet 33, a transparent window 34 is mounted in the display window. Therefore, light projected by the light-emitting diodes 8 is outwardly projected through the lattice holes of the lattice plate 32a or 32b, the diffusion sheet and the window.

It is possible to properly exchange the lattice plates 32a and 32b in which the shapes of the lattice holes are different, whereby it is possible to change the dot shape of an image displayed on the LED display panel 9. The shapes of the lattice holes, rendered round and rectangular in this embodiment, may alternatively be still another shape such as an asteroid shape.

According to this embodiment 5, further, the diffusion sheet 33 is provided on the lattice plate 32a or 32b for diffusing the light emitted by the light-emitting diodes 8 and thereafter projecting the light outward, whereby display of the LED display panel 9 entirely becomes soft and smooth display.

An embodiment 6 of the present invention is now described.

Figure 9:
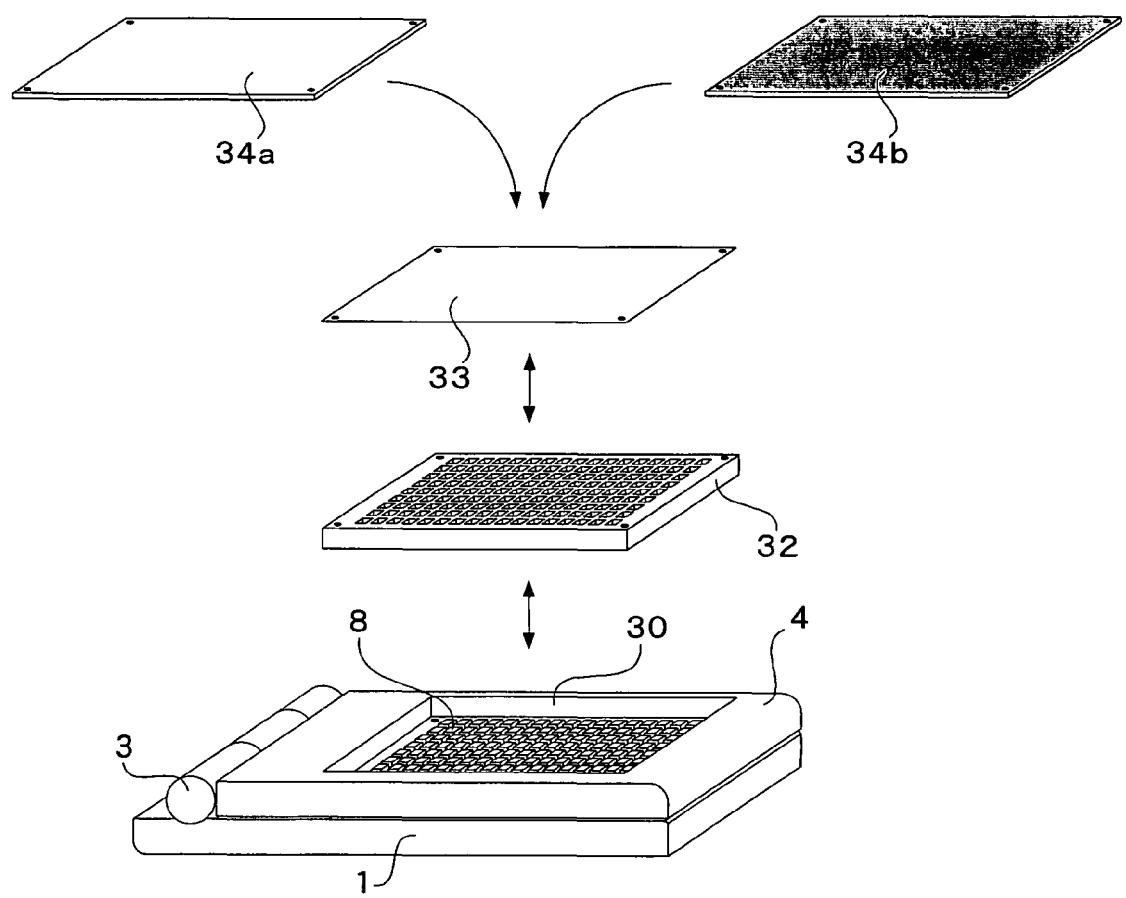
FIG. 9 is a perspective view showing an embodiment 6 rendering a window 34 replaceable with another window 34 of a different color.

FIG. 9 is a perspective view showing the embodiment 6 rendering a window 34 replaceable with another window 34 of a different color. Referring to FIG. 9, 34a and 34b are windows colored with different colors, and either window 34a or 34b is properly arranged on a diffusion sheet 33 and mounted on a display window 30.

Therefore, the windows 34a and 34b are replaceable, whereby it is possible to perform display of different colors even if light-emitting diodes 8 are light-emitting devices of a single color.

An embodiment 7 of the present invention is now described.

Figure 10:
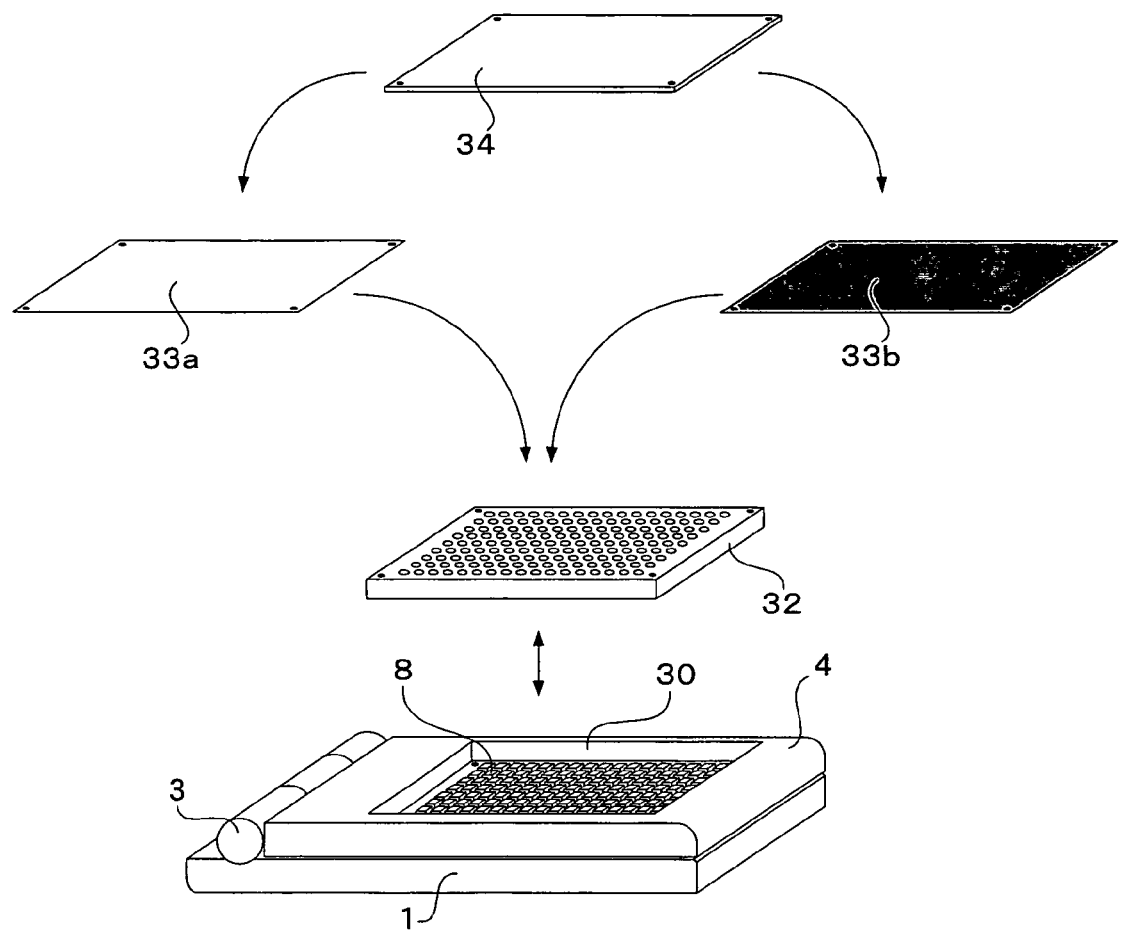
FIG. 10 is a perspective view showing an embodiment 7 rendering a diffusion sheet 33 replaceable with another diffusion sheet 33 of a different color.

FIG. 10 is a perspective view showing the embodiment 7 rendering a diffusion sheet 33 replaceable with another diffusion sheet 33 of a different color. Referring to FIGS. 10, 33a and 33b are diffusion sheets colored with different colors, and either diffusion sheet 33a or 33b is properly arranged on a lattice plate 32 and mounted on a birth and the blood type stored in the memory part 14 to the counter portable telephone via the infrared communication means 22a. The counter portable telephone receiving the data via the infrared communication means 22b similarly returns information such as the date of birth and the blood type stored in the memory part 14 via the infrared communication means 22b.

While the respective embodiments of the present invention have been described, various types of use modes are conceivable by making the best use of the display of high luminance with low power consumption in the portable apparatus according to the present invention.

FIG. 11 shows an example thereof, which displays a time pattern on an LED display panel 9 of a portable telephone loaded on a charging holder.

Referring to FIG. 11, 35 is a charging holder charging a battery 20 of the portable telephone, to which a connecting cord 36 for connecting the same to an external power source is connected. The portable telephone loaded on the charging holder 35 displays the time pattern on the LED display panel 9.

In other words, the user previously sets setting of making clock display during charging by operating the operation keys 2 of the operation part 17 in FIG. 3. This setting is stored in the memory part 14 by the baseband IC 13.

When the portable telephone is loaded on the charging holder 35 and the external power source is supplied to the charging terminal 21, the power control part 19 detects this and starts charging the battery 20, while posting that the same is under charging to the baseband IC 13.

When knowing that setting under charging is in setting of displaying the time pattern on the LED display panel 9 by referring to the memory part 14, the baseband IC 13 reads the current time data from the RTC 18. The read time data is converted in the baseband IC 13 to display pattern data stored in the memory part 14, and transferred to the control microcomputer 24 controlling the LED display panel 9. The control microcomputer 24 receiving the display pattern data makes the LED display panel 9 light the pattern of clock display through the X-directional control driver 25 and the Y-directional control driver 26. The baseband IC 13 reads the current time data from the RTC 106 every constant time, and updates the time display on the LED display panel 9.

While it is assumed that this exemplary usage performs time display on the LED display panel 9 when the portable telephone is loaded on the charging holder 35, it may perform another display such as letter display.

FIG. 12, showing another exemplary usage, is a diagram showing exemplary usage for performing affinity divination with two portable telephones.

FIG. 12 shows the back surfaces of display-side casings 4a and 4b of the two portable telephones, in which 8a and 8b are matrix-arranged light-emitting diodes and 9a and 9b are LED display panels. As this exemplary usage, infrared communication means 22a and 22b as local data communication means are provided on the respective portable telephones.

Operations are now described by FIG. 3.

In other words, respective users set the two portable telephones to an affinity divination mode by operating the operation keys 2. When recognizing the affinity divination mode, the baseband IC 13 of each portable telephone starts an affinity divination program stored in the memory part 14. When thereafter approximating the two portable telephones to an infrared-communicable distance and each user operates a communication start key, the baseband IC 13 transmits information such as the date of birth and the blood type stored in the memory part 14 to the counter portable telephone via the infrared communication means 22a. The counter portable telephone receiving the data via the infrared communication means 22b similarly returns information such as the date of birth and the blood type stored in the memory part 14 via the infrared communication means 22b.

The baseband IC 13 in each of the two portable telephones compares the counter information and its own information with each other, operates affinity according to the program stored in the memory part 14, and transfers resulting display pattern data to the control microcomputer 24. The control microcomputer 24 receiving the display pattern data makes the LED display panel 9a or 9b display the display pattern through the X-directional control driver 25 and the Y-directional control driver 26. While the exemplary displays of FIG. 12 display a single heart shape on the two LED display panels 9a and 9b, another mark, another graphic or other letters are also available. It is also possible to synchronize the two LED display panels 9a and 9b with each other to make flash display.

Figure 13:
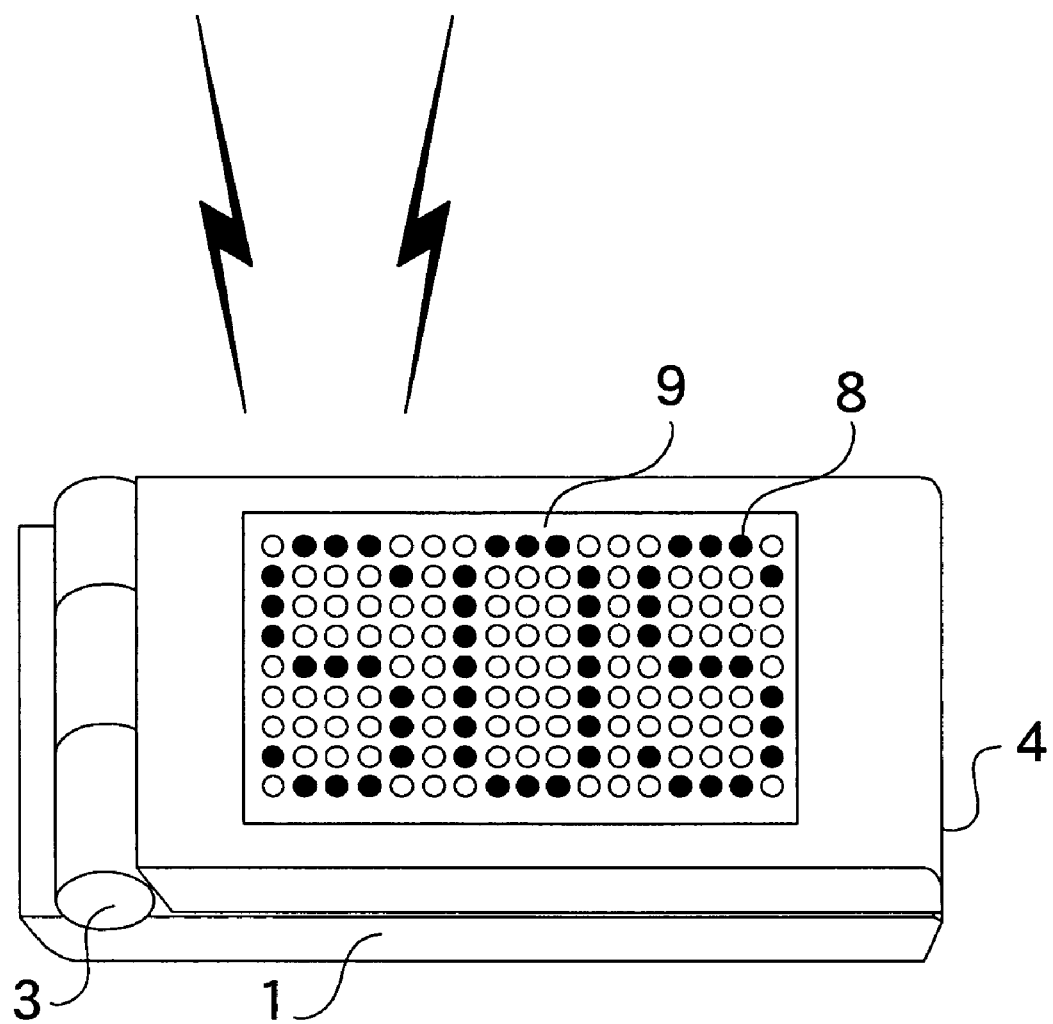
FIG. 13 is a diagram showing exemplary usage as a crime prevention buzzer.

FIG. 13 is a diagram showing exemplary usage as a crime prevention buzzer.

When the user presses an emergency alarm button by key operation or calls a police station or a fire station by an unforeseen accident or the like, the baseband IC 13 makes a speaker 112 sound an emergency beep through a sound part 111 according to a program of the memory part 14, while lighting the LED display panel 9. Display pattern data of "SOS" shown in FIG. 13 is stored in the memory part 14, and the baseband IC 13 transfers the display pattern data to the control microcomputer 24. The control microcomputer 24 receiving the display pattern data makes the LED display panel 9 light a pattern in the emergency alarm through the X-directional control driver 25 and the Y-directional control driver 26.

According to this exemplary usage, therefore, it is possible to make warning display of high luminance along with a warning sound.

INDUSTRIAL AVAILABILITY

It is possible to utilize the portable apparatus according to the present invention in the field of a portable radio terminal such as a portable telephone, a portable information terminal and the like.

What is claimed is:

1. A portable apparatus comprising:
   a hinge coupling an end of an operation-side casing having an operation part and an end of a display-side casing having a main display part with each other for pivotable movement thereof about a first axis;
   an LED display panel arranged in a display window formed on a casing surface of said display-side casing other than a surface provided with the main display part and which has a plurality of light-emitting diodes (LEDs) matrix-arranged in a plane;
   a display control unit to control display contents of said plurality of light-emitting diodes of said LED display panel on the basis of user-created graphic pattern input display data input through said operation part; and
   a main control unit to control both said main display part and said LED display panel, to register said user-created graphic pattern input display data input through said operation part, and to output said user-created graphic pattern input display data displayed on said LED display panel to said display control unit, wherein
   said operation part and said main display part are respectively provided on surfaces of said operation-side casing and said display-side casing which face each other in their closed positions;
   said LED display panel is provided on a surface of said display side casing opposed to the surface provided with the main display part; and
   said display-side casing is configured to be rotatable by at least approximately 180° about a rotation axis perpendicular to the core of the first axis of the hinge.

2. The portable apparatus according to claim 1, further comprising.
   a battery supplying power to said LED display panel, the display control unit and the main control unit.

3. The portable apparatus according to claim 1, wherein said main display part has a higher resolution than said LED display panel.

4. The portable apparatus according to claim 2, wherein the battery is provided in the operation-side casing.

5. The portable apparatus according to claim 1, wherein a display pattern to be displayed on said LED display panel is graphic pattern, a design pattern or a letter pattern.

6. The portable apparatus according to claim 1, further comprising:
   a memory, wherein said graphic pattern input display data is registered in the memory.

7. The portable apparatus according to claim 1, further comprising:
   operation keys operable in a state that the operation-side casing and the display-side casing are in their closed position, wherein
   said main control unit switches the LED display between a power on state and a power off state by operation of one of said operation keys, and
   switches between graphic patterns of said registered user-created graphic pattern input data as the display contents of the LED display panel by operation of another one of said operation keys.

8. The portable apparatus according to claim 1, wherein said plurality of LEDs of said LED display panel are matrix-arranged in a plurality of rows and a plurality of columns at a pitch of approximately 3.2 mm.

9. A portable apparatus comprising:
   a hinge coupling an end of an operation-side casing having an operation part and an end of a display-side casing having a main display part with each other for pivotable movement thereof;
   an LED display panel which is arranged in a display window formed on a casing surface of said display-side casing other than a surface provided with the main display part and which has a plurality of light-emitting diodes (LEDs) matrix-arranged in a plane;
   a display control unit to control display contents of said plurality of light-emitting diodes of said LED display panel on the basis of user-created graphic pattern input display data input through said operation part;
   a main control unit to control both said main display part and said LED display panel, to register said user-created graphic pattern input display data input through said operation part as graphic pattern input data, and to output said user-created graphic patterns input display data displayed on said LED display panel to said display control unit; and
   operation keys operable in a state that the operation-side casing and the display-side casing are in their closed position,
   wherein the main control unit
   switches the LED display between a power on state and a power off state by operation of one of said operation keys, and
   switches between graphic patterns of said registered user-created graphic pattern input data as the display contents of the LED display panel by operation of another one of said operation keys.

10. The portable apparatus according to claim 9, wherein the main display part is provided on a surface of said display-side casing facing said operation-side casing when the operation-side casing and the display-side casing are in their closed position.

11. The portable apparatus according the claim 9, wherein the LED display panel is provided on a surface of said display-side casing opposed to the surface provided with the main display part.

12. The portable apparatus according to claim 9, wherein a display pattern to be displayed on said LED display panel is a graphic pattern, a design pattern or a letter pattern.

13. The portable apparatus according to claim 9, further comprising:
   a memory, wherein
   said graphic pattern input display data is registered in the memory.

* * * * *